United States Patent
Chien et al.

(10) Patent No.: US 11,590,620 B2
(45) Date of Patent: Feb. 28, 2023

(54) MOTION CONTROL METHOD FOR DUAL-SPINDLE MACHINING, DUAL-SPINDLE MACHINING APPARATUS AND COMPUTER PROGRAM PRODUCT

(71) Applicant: Renyi Medical Co., Ltd., New Taipei (TW)

(72) Inventors: Wei-Chih Chien, New Taipei (TW); Meng-Long Lai, New Taipei (TW)

(73) Assignee: RENYI MEDICAL CO., LTD., New Taipei (TW)

( * ) Notice: Subject to any disclaimer, the term of this patent is extended or adjusted under 35 U.S.C. 154(b) by 0 days.

(21) Appl. No.: 17/568,283

(22) Filed: Jan. 4, 2022

(65) Prior Publication Data
US 2022/0219274 A1 Jul. 14, 2022

(30) Foreign Application Priority Data
Jan. 8, 2021 (TW) ................. 110100899

(51) Int. Cl.
*B23Q 15/12* (2006.01)
*G05B 19/19* (2006.01)
*G05B 19/4155* (2006.01)

(52) U.S. Cl.
CPC ........... *B23Q 15/12* (2013.01); *G05B 19/19* (2013.01); *G05B 19/4155* (2013.01); *G05B 2219/45124* (2013.01)

(58) Field of Classification Search
None
See application file for complete search history.

(56) References Cited

U.S. PATENT DOCUMENTS 10,073,434 B1 * 9/2018 Hollander .............. G05B 19/19

* cited by examiner

*Primary Examiner* — Ryan A Jarrett
(74) *Attorney, Agent, or Firm* — WPAT, PC

(57) ABSTRACT

The present application discloses a motion control method for dual-spindle machining and a dual-spindle machine apparatus. A control device performs data reconstruction of segmentation and checkpoint setting according to first and second data, respectively, to correspondingly form first and second instruction sequences, thereby simultaneously controlling two motion control cards, allowing two machining devices coupled at a back end of the motion control cards to perform machining on two opposite sides of a workpiece. With the checkpoints arranged in the instruction sequences, the machining devices each having one machining tool are provided with a collaboration mechanism, so that the control device is allowed to continue sending instructions of the next segment to the two motion control cards upon arrival of both the instruction sequences at the checkpoints. Thus, the simultaneous dual-spindle apparatus not only achieves the feature of high efficiency of single-side separate machining but also provides the feature of dual-side collaboration, solving the issue of damage caused by mutual interference during a synchronous dual-spindle operation.

16 Claims, 4 Drawing Sheets

MOTION CONTROL METHOD FOR DUAL-SPINDLE MACHINING, DUAL-SPINDLE MACHINING APPARATUS AND COMPUTER PROGRAM PRODUCT

BACKGROUND OF THE INVENTION

Field of the Invention

The present invention relates to a machining control method and apparatus, and more particularly to a motion control method for dual-spindle machining and a dual-spindle machining apparatus.

Description of the Prior Art

Regarding machining of a workpiece, a machining process is usually performed by means of control on a machining tool, so as to perform a machining process, for example, milling, on the workpiece.

In seek of machining efficiency, a dual-spindle machining apparatus that simultaneously performs machining on two opposite sides of a workpiece is used to reduce the machining time. However, simultaneous control of dual spindles face numerous limitations and difficulties. For example, to prevent mutual interference of a synchronous dual-spindle operation, the synchronous dual-spindle operation activated only when the same process is used for symmetric machining on the two opposite sides of the workpiece. As a result, the performance of simultaneous machining on both sides of the dual-spindle machining apparatus cannot be used effectively.

SUMMARY OF THE INVENTION

It is an object of the present invention to enhance machining efficiency.

It is another object of the present invention to effectively utilize the feature of dual-spindle machining.

It is yet another object of the present invention to achieve symmetry and asymmetry features under dual-side collaboration during dual-spindle machining.

To achieve the above and other objects, the present invention provides a motion control method for dual-spindle machining for performing corresponding control on a first machining device and a second machining device on two opposite sides of a workpiece according to first control data and second control data, the first machining device and the second machining device having a first machining tool and a second machining tool moving towards each other in a feed axis so as to perform a machining process on the workpiece. The motion control method includes a segmentation step, a checkpoint setting step and a control step. The segmentation step segments the first control data into a plurality of first segmented control data, and segments the second control data into a plurality of second segmented control data. The checkpoint setting step inserts a first checkpoint between each adjacent two of first segmented control data to form a first instruction sequence, and inserts a second checkpoint between each adjacent two of second segmented control data to form a second instruction sequence. The control step sequentially outputs the first instruction sequence to a first motion control card to correspondingly control a first machining device coupled to the first motion control card, and sequentially outputs the second instruction sequence to a second motion control card to correspondingly control a second machining device coupled to the second motion control card. The control step includes a collaboration mechanism, which stops outputting a subsequent instruction upon arrival of the first instruction sequence or the second instruction sequence output at any checkpoint, and allows the two instruction sequences to continue outputting the subsequent instructions to the corresponding motion control cards only upon arrival of the other instruction sequence output at any checkpoint.

In one embodiment of the present invention, each control data includes a plurality of blade number data and corresponding machining route data, and in each segmented control data segmented from the segmentation step, the blade number data in the individual segmented control data is the same.

In one embodiment of the present invention, the motion control method is for controlling a first machining device, a second machining device, and a support having a rotation axis, wherein the support is for supporting the workpiece. The control method further includes: in the control step, the first motion control card is regarded as a host control terminal, the second motion control card is regarded as a slave terminal, rotation control data of the rotation axis is at least one of the first segmented control data, the second motion control card serving as the slave terminal is put to wait upon arrival of the output first instruction sequence at the rotation control data, waiting of the second motion control card is relieved upon completion of the rotation control, and the two instruction sequences are controlled to output the subsequent instructions to the corresponding motion control cards. The rotation axis may be perpendicular to the feed axis.

In one embodiment of the present invention, the motion control method is used for controlling a first machining device, a second machining device, and a support having two rotation axes, wherein the support is used for supporting the workpiece. The motion control method further includes: in the control step, the first motion control card is regarded as a host control terminal, the second motion control card is regarded as a slave terminal, rotation control data of the two rotation axes is at least one of the first segmented control data, the second motion control card serving as the slave terminal is put to wait upon arrival of the output first instruction sequence at the rotation control data, waiting of the second motion control card is relieved upon completion of rotation control, and the two instruction sequences are controlled to output the subsequent instructions to the corresponding motion control cards. The two rotation axes may individually be perpendicular to the feed axis, and the two rotation axes are perpendicular to each other.

To achieve the above and other objects, the present invention further provides computer program product having a computer program for controlling dual spindles to simultaneously perform a machining process on a workpiece on two opposite sides of the workpiece. When the computer program is loaded by a computer, first control data and second control data are input, and the computer program is executed, the motion control method above can be implemented.

To achieve the above and other objects, the present invention further provides a dual-spindle machining apparatus that performs a machining process on a workpiece according to first control data and second control data. The dual-spindle machining apparatus includes a support, a first machining device, a second machining device, a first motion control card, a second motion control card and a control device. The support is for fixing the workpiece. The first machining device is arranged on one side of the support, and includes a first machining tool that is moved on a feed axis. The second machining device is arranged on the other side of the support, and includes a second machining tool that is moved on the feed axis. The first motion control card is coupled to the first machining device. The second motion control card is coupled to the second machining device. The control device is individually coupled to the first motion control card and the second motion control card. The control device is configured to segment the first control data into a plurality of first segmented control data and insert a first checkpoint between individual segmented control data to form a first instruction sequence, and to segment the second control data into a plurality of second segmented control data and insert a second checkpoint between individual segmented control data to form a second instruction sequence. The control device further configured to sequentially output the first instruction sequence to the first motion control card to correspondingly control a first machining device, and to sequentially output the second instruction sequence to the second motion control card to correspondingly control the second machining device. Wherein, the control device stops outputting a subsequent instruction upon arrival of the output first instruction sequence or second instruction sequence at any checkpoint, and allows the two instruction sequences to continue outputting the subsequent instructions only upon arrival of the other instruction sequence at any checkpoint.

In one embodiment of the present invention, each control data includes a plurality of blade number data and corresponding machining route data, and the control device causes the individual segmented control data to have the same blade number data.

In one embodiment of the present invention, each of the first machining device and the second machining device provides driving capabilities for three axes, so that the first machining tool and the second machining tool have degrees of freedom for moving on the feed axis, a second axis and a third axis. Any two of the feed axis, the second axis and the third axis may be perpendicular to each other.

In one embodiment of the present invention, the first machining device further provides a driving capability for a fourth axis, so that the support has a degree of freedom for rotating on the fourth axis. The fourth axis may be perpendicular to the feed axis. The control device configures rotation control data of the fourth axis to be at least one of the first segmented control data, and puts the second motion control card to wait upon arrival of the first instruction sequence output by the control device at rotation control of the fourth axis; the control device relieves waiting of the second motion control card upon completion of the rotation control, and allows the two instruction sequences to continue outputting the subsequent instructions.

In one embodiment of the present invention, the first machining device further provides a driving capability for a fifth axis, so that the support has a degree of freedom for rotating on the fifth axis, wherein the fifth axis may be perpendicular to the fourth axis. The control device configures rotation control data of the fourth axis and the fifth axis to be at least one of the first segmented control data, and puts the second motion control card to wait upon arrival of the first instruction sequence output by the control device at rotation control of the fourth axis or the fifth axis; and the control device relieves waiting of the second motion control card upon completion of the rotation control, and allows the two instruction sequences to continue outputting the subsequent instructions.

Accordingly, with the checkpoints arranged in the instruction sequences and the use of the corresponding motion control cards, waiting is carried out upon execution completion of each segmented control data to provide the machining devices with a collaboration mechanism. Under such control specifications, machining ranges and degrees on both sides can be managed, asymmetric machining processes of respective machining of both sides can be used to effectively practice high efficiency of simultaneous dual-spindle driving. Moreover, rotation control of the support can be added to enable the dual-spindle machining apparatus to perform synchronous control of more than seven or eight axes.

DETAILED DESCRIPTION OF THE EMBODIMENTS

The technical characteristics, contents, advantages and effects of the present invention will become apparent from the following detailed description taken with the accompanying drawing.

Singular quantitative expressions, such as "a," "an," and "one", used herein are descriptive of units, elements, structures, devices, circuits, systems, locations or regions to not only facilitate illustration but also generally define the scope of the present disclosure. Therefore, unless otherwise specified clearly, the expressions must be interpreted in such a manner to mean "one or more" and include their plural forms.

Expressions, such as "comprise", "include", "have" and the like, used herein are not limited to essential components of the present disclosure but include any other essential components not definitely disclosed by the present disclosure, yet they are usually intrinsic to the units, elements, structures, devices, circuits, systems, locations or regions.

Ordinal numbers, such as "first" and "second," used herein are intended to distinguish or correlate identical or similar components or structures and do not necessarily imply what order the units, elements, structures, devices, circuits, systems, locations or regions are in in terms of space. It is understood that in some situations or arrangements, the ordinal numbers may be swapped without affecting the effects of implementation of the present disclosure.

In computer numeral control (CNC), a numerically controlled (NC) program instruction is input to a control device (for example, a computer), and a process is performed by the control device to generate an instruction sequence for manipulating a back-end machining device or multiple back-end machining devices, thereby performing machining (for example, cutting) on a workpiece by a single machining tool or multiple machining tools of the corresponding machining device so as to complete a designed part.

Computer aided design (CAD) and computer aided manufacturing (CAM) can be used to assist in designing model data of a part and to generate corresponding route planning data and blade number data, accordingly forming numerically controlled program instructions for CNC to perform machining.

Figure 1:
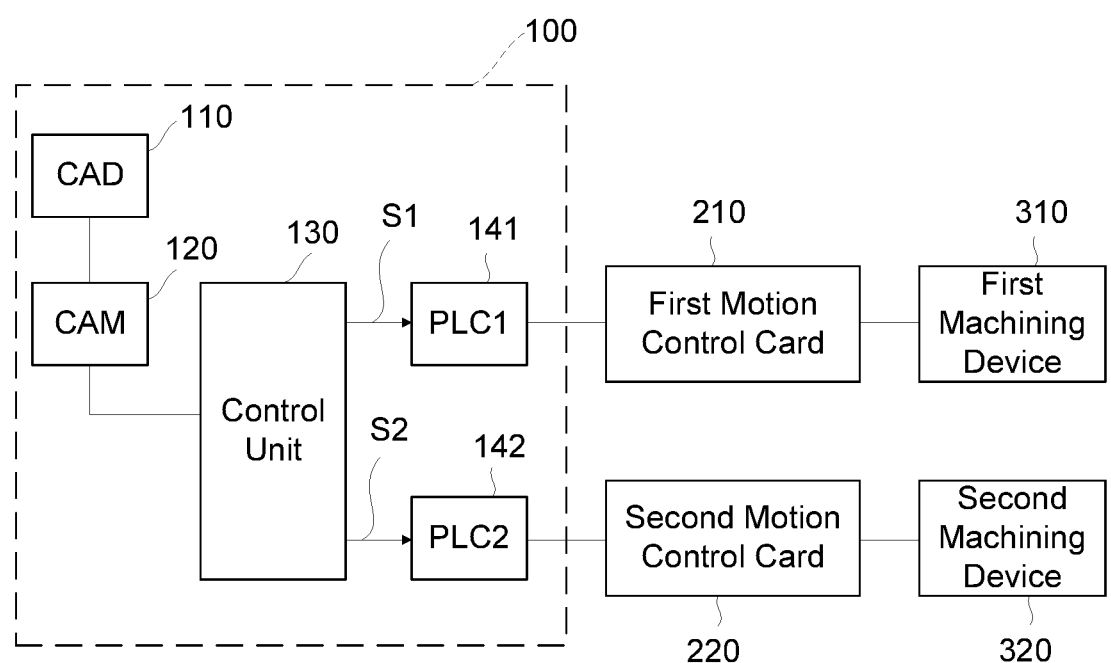
FIG. 1 is a function block diagram of a dual-spindle machining apparatus according to an embodiment of the present invention.
Figure 2:
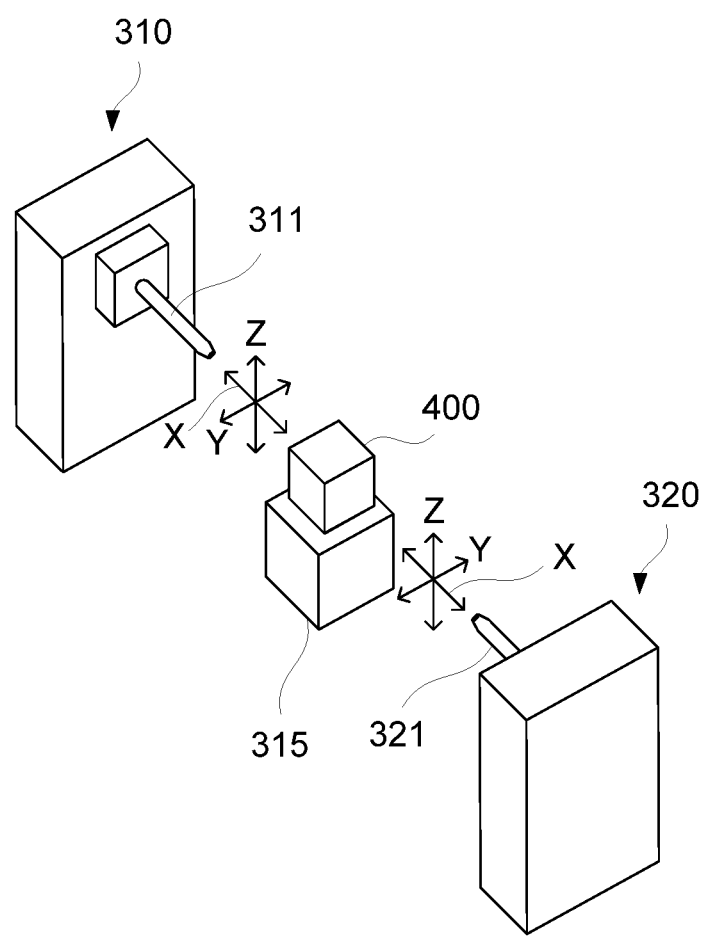
FIG. 2 is a partial device schematic diagram of a dual-spindle machining apparatus in FIG. 1.

Refer to FIG. 1 and FIG. 2, FIG. 1 shows a function block diagram of a dual-spindle machining apparatus according to an embodiment of the present invention, and FIG. 2 shows a partial device schematic diagram of the dual-spindle machining apparatus in FIG. 1. The dual-spindle machining apparatus includes a support 315, a first machining device 310, a second machining device 320, a first motion control card 210, a second motion control card 220 and a control device 100.

The support 315 is for supporting a workpiece 400, and may further provide a function of a single spindle or dual spindles (C1 and C2), with associated details to be given in the following embodiments. The workpiece 400 may be a medical accessory, and more particularly, a dental item, such as a denture, a crown or an implant. The first machining device 310 and the second machining device 320 have a first machining tool 311 and a second machining tool 321, respectively, for performing a machining process on both sides of the workpiece 400, wherein machining efficiency can be further enhanced as the number of processes simultaneously performed on both sides increases.

During a machining process, the first machining tool 311 and the second machining tool 321 are, for example, driven to be in a rotating state, so as to produce a machining effect (for example, cutting) on the workpiece 400 using surface outlines of the machining tools.

The control device 100 generates, according to control data generated by a CAD 110 and a CAM 120 and further processed by the control unit 130, a first instruction sequence S1 and a second instruction sequence S2 for correspondingly controlling the first machining device 310 and the second machining device 320. In an example of CNC control, the control unit 130 is correspondingly connected to the first motion control card 210 and the second motion control card 220 by a programmable controller 141 (PLC1) and a programmable controller 142 (PLC2), so as to input the instruction sequences to the motion control cards. Next, the motion control cards correspondingly control the machining devices according to the instructions received. For example, the motion control cards issue pulse signals to drivers in the machining devices, and the drivers transmit pulse signals to servo motors in the machining devices to further control movement of the machining tools.

The control unit 130 is, for example, a computer installed with a predetermined computer program, which is used for further performing the process above to restructure control data generated by the CAD 110 and the CAM 120, allowing one single computer to simultaneously perform various machining processes in a dual-spindle configuration by means of two motion control cards. Thus, the machining devices 310 and 320 on both sides of the workpiece 400 can be further operated in asymmetric machining processes, so that the machining processes on both sides can be arranged with high degrees of freedom, hence significantly enhancing machining efficiency. In other embodiments, the control device 100 may also be a computer integrated with a programmable controller. The control data generated by the CAD 110 and the CAM 120 can be generated by the control device 100 or be input externally.

For example, the predetermined computer program may include multiple templates, each of which corresponds to at least one machining process. Once the control data calculated by the CAD 110 and the CAM 120 is input to the predetermined computer program, the predetermined computer program can generate a corresponding instruction sequence according to the template selected by the operator and a motion control and processing method disclosed by the present application. In terms of dental restoration, the templates above can be divided into types of patches, inlays, crowns and nails, and basic structures thereof can be applied to the control data (for example, templates of different types correspond to different mechanical parameters).

As shown in FIG. 2, each of the machining devices 310 and 320 can provide the corresponding machining tool 311 or 321 with degrees of freedom in three axes, that is, a feed axis X, a second axis Y and a third axis Z. Taking the three axes for example, usually the feed axis X is arranged to directly face a feed direction of the workpiece 400, and any two among the feed axis X, the second axis Y and the third axis Z are perpendicular to each other. In the dual-spindle configuration, usually the first machining tool 311 and the second machining tool 321 in the feed axis X of the two machining devices 310 and 320 move relative to each other, so that the respective machining processes can be performed on both sides of the workpiece 400. The machining devices 310 and 320 in FIG. 2 are merely a simple representation, and an axial movement mechanism is a common mechanical control structure and associated details are thus omitted herein.

Figure 3:
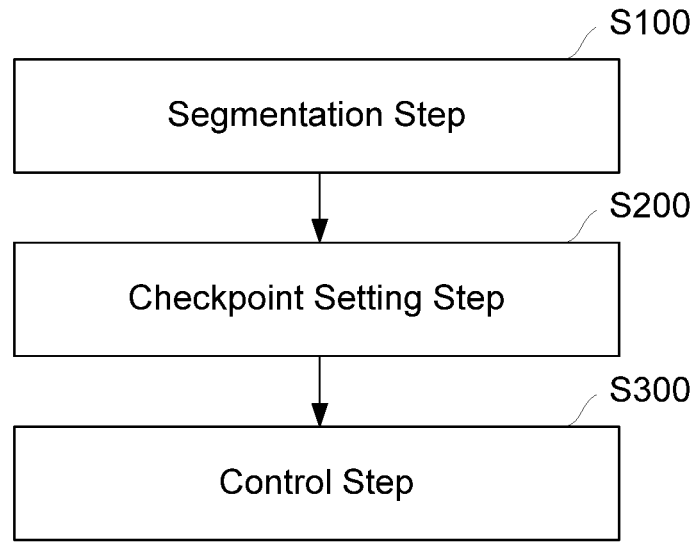
FIG. 3 is flowchart of a motion control method for dual-spindle machining according to an embodiment of the present invention.

Referring to FIG. 1 to FIG. 3, FIG. 3 shows flowchart of a motion control method for dual-spindle machining according to an embodiment of the present invention. The motion control and processing method disclosed by the present application can correspondingly generate, according to control data calculated by the CAD 110 and the CAM 120 and processed by data reconstruction of segmentation and checkpoint setting, the first instruction sequence S1 and the second instruction sequence S2 for operating two machining devices. The first instruction sequence S1 and the second instruction sequence S2 are output from the corresponding programmable controllers 141 and 142 and transmitted to the corresponding motion control cards 210 and 220, and motion tracks of the machining tools 311 and 321 of the corresponding machining devices 310 and 320 are then controlled by the motion control cards 210 and 220. For an example, if the support 315 has a rotation function, a control instruction for rotation is assigned in the first instruction sequence S1.

The motion control method of a motion control and processing method disclosed by the present application includes step S100 of a segmentation step, step S200 of a checkpoint setting point, and step S300 of a control step.

The segmentation step S100 is used for processing the first control data and the second control data calculated by the CAD 110 and the CAM 120. The first control data and the second control data respectively correspond to machining data needed on two opposite sides of a workpiece. In this step, the first control data is segmented into a plurality of first segmented control data, and the second control data is segmented into a plurality of second segmented control data. The segmentation may be performed according to a corresponding machining method, or may be performed according to blade numbers used in the machining process.

The checkpoint setting step S200 is to insert a checkpoint between two adjacent segmented control data. For the first control data after the segmentation, any two adjacent first segmented control data is inserted by a first checkpoint in between, and the plurality of first segmented control data having the first checkpoints therebetween become the first instruction sequence S1. For the second control data after the segmentation, any two adjacent second segmented control data is inserted by a second checkpoint in between, and the plurality of second segmented control data having the second checkpoints therebetween become the second instruction sequence S2. Step S100 and step S200 are further described with reference to FIG. 4 shortly.

The control step S300 is to sequentially output control instructions in the instruction sequences S1 and S2 to the corresponding motion control cards to correspondingly control the machining devices. The first instruction sequence S1 is sequentially output to the first motion control card 210 so as to correspondingly control the first machining device 310 coupled to the first motion control card 210. The second instruction sequence S2 is sequentially output to the second motion control card 220 so as to correspondingly control the second machining device 320 coupled to the second motion control card 220. In the control step S300, the two machining devices are provided with a collaboration mechanism having a collaboration effect. In this collaboration mechanism, when the instructions of any of the instruction sequences are output to a checkpoint, the control device 100 stops outputting subsequent instructions of this instruction sequence (with a produced effect of suspending the corresponding machining device), and meanwhile the control device 100 checks output conditions of the instructions of the other instruction sequence. Upon arrival of the instructions of the other instruction sequence also at a checkpoint, the control device 100 then allows the subsequent instructions of both instruction sequences to continue to be output to the corresponding motion control cards.

For example, when the instructions of the first instruction sequence S1 output by the control device 100 arrive at a first checkpoint, the control device 100 at this point temporarily suspends the output of the subsequent instructions of the first instruction sequence S1, such that the first motion control card 210 no longer receives the subsequent control instructions and the first machining device 310 naturally stops operating. Moreover, the control device 100 checks output instructions of the second instruction sequence S1. If the output instructions of the second instruction sequence S2 have not yet arrived at a second checkpoint, the control device 100 keeps the temporary suspension of the output of the subsequent instructions of the first instruction sequence S1, and continues checking the output instructions of the second instruction sequence S2. Upon arrival of the output instructions of the second instruction sequence S2 at the second checkpoint, the control device 100 then performs suspended instruction clearance control to allow the instructions of the first instruction sequence S1 and the second instruction sequence S2 to be continually output to the corresponding motion control cards.

Since an instruction sequence is a series of control instructions, the establishment of the data reconstruction and the collaboration mechanism enable the control of every segment to clearly define the respective operation statuses of the machining devices on both sides. Under the operation of such arrangement, mutual interference during synchronous dual-spindle operations can be eliminated. Thus, the motion control method, the computer program product performing the method and the dual-spindle machining apparatus performing the method disclosed by the present invention can be suitably applied to asymmetric machining processes, further fully practicing simultaneous processing performance of the dual-spindle machining apparatus. The computer program product is, for example, a set of software, and controls a plurality of motion control cards when loaded and executed by a computer, so that a machining apparatus can be driven in a multi-spindle synchronous machining mode.

In the segmentation step S100, preferably, segmentation is performed according to blade numbers used in the machining process. The control data calculated by the CAD 110 and the CAM 120 includes blade number data and corresponding machining route data. The machining method refers to a machining route of a certain range or mode. When segmentation is performed according to the blade numbers used for machining, each of the segmented control data segmented in the segmentation step S100 has the same blade number data. For example, although one segmented control data may have different machining route data, the blade number data therein is the same.

Figure 4:
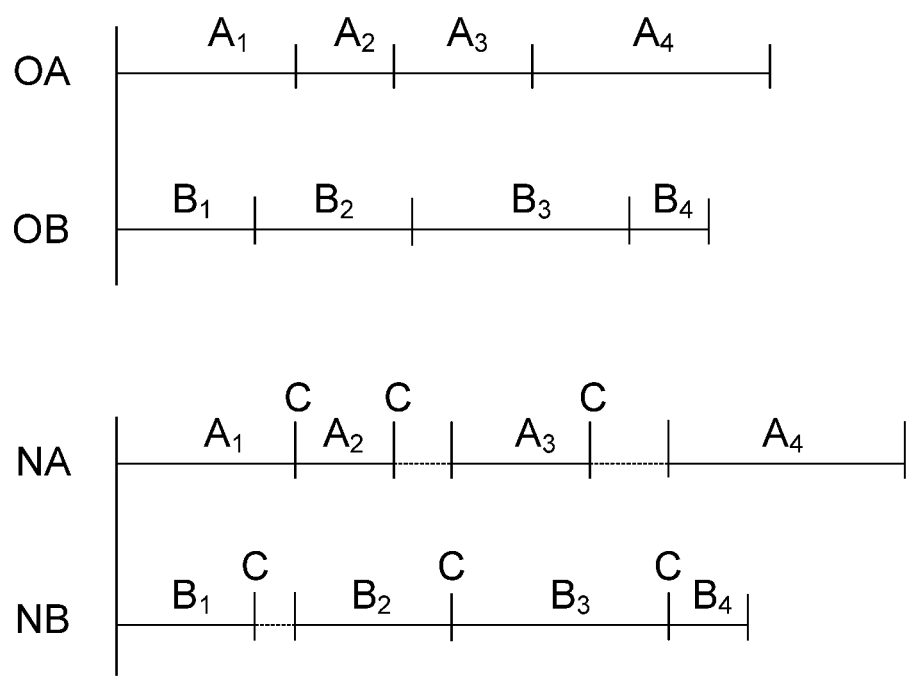
FIG. 4 is a schematic diagram of segmentation and reconstruction of control data according to an embodiment of the present invention.

FIG. 4 shows a schematic diagram of segmentation and reconstruction of control data according to an embodiment of the present invention. FIG. 4 shows an example of instructions segmented according to blade numbers, wherein the horizontal axis represents time. OA is a first instruction sequence after segmentation and before reconstruction, $A_1$ is a machining route arranged under a first blade number, $A_2$ is a machining route arranged under a second blade number, and so forth. OB is a second instruction sequence after segmentation and before reconstruction, $B_1$ is a machining route arranged under a first blade number, $B_2$ is a machining route arranged under a second blade number, and so forth. The machining routes that need to be operated under the blade numbers have different lengths, and the machining routes required on both sides are also different, such that the instruction sequences OA and OB have different lengths. More importantly, when one instruction sequence needs to switch to another blade to perform a new process, it is difficult to manage a current sequence position of the other instruction sequence. More particularly, unpredictability rises as the instruction sequence gets longer, such that the risk of mutual interference during a synchronous dual-spindle operation is significantly increased and the instruction sequences OA and OB may become unusable.

In the reconstruction of the instruction sequence, a checkpoint C is inserted on each segmentation position, and instruction sequences NA and NB in FIG. 4 can then be exhibited according to the operation of the collaboration mechanism above, wherein starting points of individual segments of the two instruction sequences become the same. NA is a first instruction sequence after the segmentation and reconstruction, and NB is the second instruction sequence after the segmentation and reconstruction. Since the starting points of both instruction sequences can be clearly defined in each segment, mutual interference under such operating conditions can be effectively eliminated, allowing asymmetric machining to be performed simultaneously on both sides of the dual-spindle machining apparatus, fully practicing the high performance of dual-spindle machining.

Figure 5:
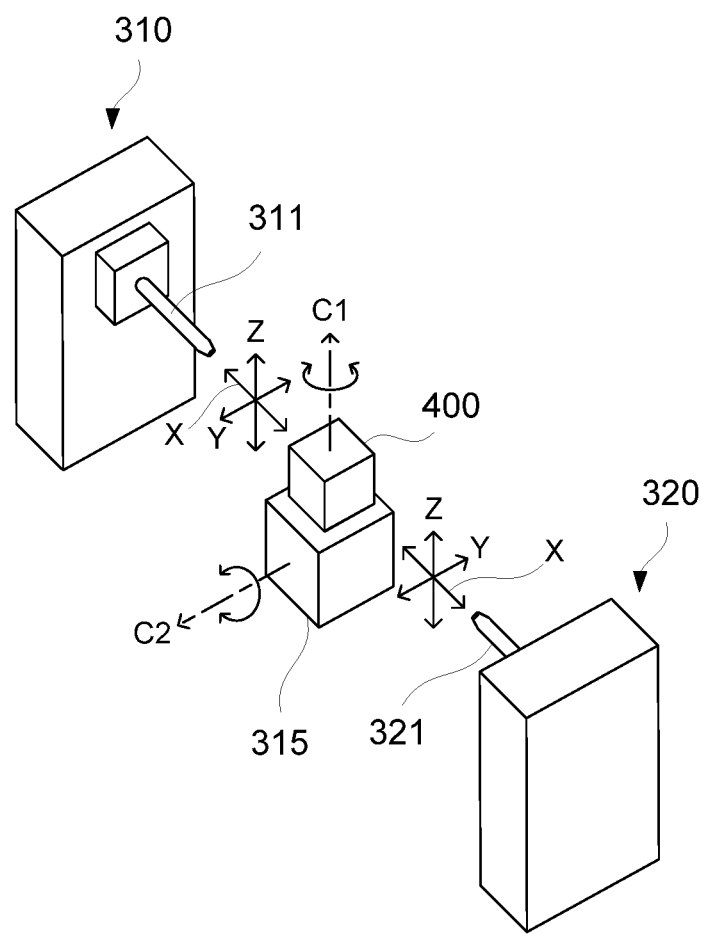
FIG. 5 is a partial device schematic diagram of a dual-spindle machining apparatus according to another embodiment of the present invention.

FIG. 5 shows a partial device schematic diagram of a dual-spindle machining apparatus according to another embodiment of the present invention. The embodiment in FIG. 5 further provides the first machining device 310 with a driving capability of an additional axial direction. This driving capability is used for driving one single rotation axis (C1 or C2) or both rotation axes C1 and C2 of the support, so that the workpiece rotates in a fourth axis C1 and/or a fifth axis C2, further providing a greater machining angle. In other embodiment, the support 315 can rotate freely in the fourth axis C1 but rotate by a limited extent in the fifth axis C2. In such implementation form, the fifth axis C2 may be referred to a rocking shaft. However, damage can be caused if any machining tool is currently performing a machining process during the rotation.

Therefore, in the motion control method, the computer program product performing the method and the dual-spindle machining apparatus performing the method disclosed by the present invention can solve the aforementioned problems. In the control step S300 in FIG. 3, the first motion control card 210 may be regarded as a host control terminal and the second motion control card 220 may be regarded as a slave end. Moreover, the rotation control data of the rotation axis is assigned to the first segmented control data so that each rotation control data becomes individual segmented data in the first segmented control data (analogous to the segment Ax in FIG. 4). Upon arrival of the first instruction sequence output at the rotation control data, the second motion control card 220 serving as a slave end is put to wait, and waiting of the second motion control card 220 is relieved only upon completion of the rotation control, and the control device 100 is allowed to continue outputting the subsequent instructions in the two instruction sequences to the corresponding motion control cards.

The rotation control in FIG. 5 is assigned to one of the machining devices (the first machining device 310) and is controlled by the corresponding motion control card (the first motion control card 210). However, the present application is not limited to the above example; in other embodiments, the rotation control in other embodiments may also be analogously assigned to one of the machining devices (the second machining device 320).

The control under one single rotation axis may be once or multiple times, and the control under dual rotation axes may have rotation of different axes synchronously or asynchronously. When the rotation control is assigned to one of the machining devices and each time the rotation operation is performed, the control device 100 puts the other machining device to wait. Accordingly, the collaboration mechanism disclosed by the present application is extended to applications of single rotation axis or dual rotation axes, thereby further enhancing simultaneous machining performance and benefits of a dual-spindle machining apparatus. Currently, each motion control card (or referred to as an axle control card) can support control up to five axes. When control capabilities of more axes become available in the future, the motion control method of the specifications above, the computer program product performing the method and the dual-spindle machining apparatus performing the method can provide more machining methods and further enhanced benefits.

In conclusion, the specifications constructed by the motion control method disclosed by the present application eliminates the risk of damage caused by mutual interference during a synchronous multi-axis operation, allowing a multi-axis machining apparatus to operate in a symmetrical or asymmetrical synchronous control mode. Moreover, applications of rotation axes further allow a seven-axis (single rotation axis) or eight-axis (dual rotation axes) machining apparatus to be preserved with multi-axis synchronous control, and enable a dual-spindle or even multi-spindle machining apparatus to practice expected high performance.

While the invention has been described by means of specific embodiments, numerous modifications and variations could be made thereto by those skilled in the art without departing from the scope and spirit of the invention set forth in the claims.

What is claimed is:

1. A motion control method for dual-spindle machining, for performing corresponding control on a first machining device and a second machining device on two opposite sides of a workpiece according to first control data and second control data, the first machining device and the second machining device having a first machining tool and a second machining tool moving towards each other in a feed axis so as to perform a machining process on the workpiece; the motion control method comprising:

a segmentation step of segmenting the first control data into a plurality of first segmented control data, and segmenting the second control data into a plurality of second segmented control data;

a checkpoint setting step of inserting a first checkpoint between each adjacent two of first segmented control data to form a first instruction sequence, and inserting a second checkpoint between each adjacent two of second segmented control data to form a second instruction sequence; and a control step of outputting the first instruction sequence to a first motion control card to correspondingly control a first machining device coupled to the first motion control card, and outputting the second instruction sequence to a second motion control card to correspondingly control a second machining device coupled to the second motion control card; the control step comprising a collaboration mechanism, which stops outputting a subsequent instruction upon arrival of the first instruction sequence or the second instruction sequence output at any checkpoint, and controls the two instruction sequences to continue outputting the subsequent instructions to the corresponding motion control cards only upon arrival of one other instruction sequence at any checkpoint.

2. The motion control method according to claim 1, wherein each control data comprises a plurality of blade number data and corresponding machining route data, and in each segmented control data segmented from the segmentation step, the blade number data in the individual segmented control data is the same.

3. The motion control method according to claim 1, applied for controlling a first machining device, a second machining device, and a support having a rotation axis, the support being for supporting the workpiece; the control method comprising: in the control step, the first motion control card is regarded as a host control terminal, the second motion control card is regarded as a slave terminal, rotation control data of the rotation axis is at least one of the first segmented control data, the second motion control card serving as the slave terminal is put to wait upon arrival of the output first instruction sequence at the rotation control data, waiting of the second motion control card is relieved upon completion of the rotation control, and the two instruction sequences are controlled to output the subsequent instructions to the corresponding motion control cards.

4. The motion control method according to claim 3, wherein the rotation axis is perpendicular to the feed axis.

5. The motion control method according to claim 1, applied for controlling a first machining device, a second machining device, and a support having two rotation axes, the support being for supporting the workpiece; the motion control method comprising: in the control step, the first motion control card is regarded as a host control terminal, the second motion control card is regarded as a slave terminal, rotation control data of the two rotation axes is at least one of the first segmented control data, the second motion control card serving as the slave terminal is put to wait upon arrival of the output first instruction sequence at the rotation control data, waiting of the second motion control card is relieved upon completion of the rotation control, and the two instruction sequences are controlled to output the subsequent instructions to the corresponding motion control cards.

6. The motion control method according to claim 5, wherein the two rotation axes are individually perpendicular to the feed axis, and the two rotation axes are perpendicular to each other.

7. A non-transitory computer-readable medium, having stored therein a computer program for controlling dual spindles to simultaneously perform a machining process on a workpiece on two opposite sides of the workpiece; wherein, when the computer program is loaded by a computer, first control data and second control data are input, and the computer program is executed, the motion control method of claim 1 is implemented.

8. A dual-spindle machining apparatus, performing a machining process on a workpiece according to first control data and second control data, the dual-spindle machining apparatus comprising:
a support, for fixing the workpiece;
a first machining device, arranged on one side of the support, and comprising a first machining tool that is moved on a feed axis;
a second machining device, arranged on one other side of the support, and comprising a second machining tool that is moved on the feed axis;
a first motion control card, coupled to the first machining device;
a second motion control card, coupled to the second machining device; and
a control device, individually coupled to the first motion control card and the second motion control card, the control device is configured to segment the first control data into a plurality of first segmented control data and insert a first checkpoint between individual segmented control data to form a first instruction sequence, and to segment the second control data into a plurality of second segmented control data and insert a second checkpoint between individual segmented control data to form a second instruction sequence; the control device further configured to sequentially output the first instruction sequence to the first motion control card to correspondingly control a first machining device, and to sequentially output the second instruction sequence to the second motion control card to correspondingly control the second machining device; wherein, the control device stops outputting a subsequent instruction upon arrival of the output first instruction sequence or second instruction sequence at any checkpoint, and allows the two instruction sequences to continue outputting the subsequent instructions only upon arrival of one other instruction sequence at any checkpoint.

9. The dual-spindle machining apparatus according to claim 8, wherein each control data comprises a plurality of blade number data and corresponding machining route data, and the control device causes the individual segmented control data to have the same blade number data.

10. The dual-spindle machining apparatus according to claim 8, wherein each of the first machining device and the second machining device provides driving capabilities for three axes, so that the first machining tool and the second machining tool have degrees of freedom for moving on the feed axis, a second axis and a third axis.

11. The dual-spindle machining apparatus according to claim 10, wherein any two of the feed axis, the second axis and the third axis are perpendicular to each other.

12. The dual-spindle machining apparatus according to claim 10, wherein the first machining device further provides a driving capability for a fourth axis, so that the support has a degree of freedom for rotating on the fourth axis.

13. The dual-spindle machining apparatus according to claim 12, wherein the fourth axis is perpendicular to the feed axis.

14. The dual-spindle machining apparatus according to claim 12, wherein the control device configures rotation control data of the fourth axis to be at least one of the first segmented control data, and puts the second motion control card to wait upon arrival of the first instruction sequence output by the control device at rotation control of the fourth axis; and the control device relieves waiting of the second motion control card upon execution completion of the rotation control, and allows the two instruction sequences to continue outputting the subsequent instructions.

15. The dual-spindle machining apparatus according to claim 12, wherein the first machining device further provides a driving capability for a fifth axis, so that the support has a degree of freedom for rotating on the fifth axis, wherein the fifth axis is perpendicular to the fourth axis.

16. The dual-spindle machining apparatus according to claim 15, wherein the control device configures rotation control data of the fourth axis and the fifth axis to be at least one of the first segmented control data, and puts the second motion control card to wait upon arrival of the first instruction sequence output by the control device at rotation control of the fourth axis or the fifth axis; and the control device relieves waiting of the second motion control card upon execution completion of the rotation control, and allows the two instruction sequences to continue outputting the subsequent instructions.

* * * * *